(12) United States Patent
Chen et al.

(10) Patent No.: US 9,322,202 B2
(45) Date of Patent: Apr. 26, 2016

(54) ROTARY MECHANISM AND ELECTRONIC DEVICE THEREOF

(71) Applicant: Wistron Corporation, New Taipei (TW)

(72) Inventors: Kuang-Wen Chen, New Taipei (TW); Chun-Chiang Lai, New Taipei (TW); Yu-Hsin Huang, New Taipei (TW); Fu-Chien Chen, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 230 days.

(21) Appl. No.: 14/133,657

(22) Filed: Dec. 19, 2013

(65) Prior Publication Data

US 2015/0036270 A1 Feb. 5, 2015

(30) Foreign Application Priority Data

Jul. 31, 2013 (TW) .............................. 102127488 A (51) Int. Cl.
*G06F 1/16* (2006.01)
*E05D 11/06* (2006.01)
*G06F 1/18* (2006.01)

(52) U.S. Cl.
CPC ................ *E05D 11/06* (2013.01); *G06F 1/187* (2013.01); *E05Y 2900/606* (2013.01); *Y10T 16/551* (2015.01)

(58) Field of Classification Search
CPC ..... H05K 5/0221; G06F 1/1681; G06F 1/187; E05D 11/06; Y10T 16/551; E05Y 2900/606
USPC ............. 361/679.01, 679.02, 679.33–679.39, 361/724–727; 16/374; 312/223.1–223.2
See application file for complete search history.

(56) References Cited

U.S. PATENT DOCUMENTS 8,780,545 B2 * 7/2014 Chen ....................... G06F 1/187
248/637
2012/0281351 A1 * 11/2012 Chen ....................... G06F 1/187
361/679.37

FOREIGN PATENT DOCUMENTS

TW 301423 3/1997
TW M254054 12/2004

* cited by examiner

*Primary Examiner* — Anthony Haughton
*Assistant Examiner* — Ingrid Wright
(74) *Attorney, Agent, or Firm* — Winston Hsu; Scott Margo (57) ABSTRACT

A rotary mechanism includes a supporter and a bracket. The supporter includes a body, a pivot portion and a support portion. The body whereon the pivot portion is disposed is disposed on a base. The support portion includes a bar and a guiding structure. A low end of the bar is connected to the body, and the guiding structure is disposed on a top end of the bar. The bracket includes a frame, a constraint portion, a pivot slot structure and a contact portion. The constraint portion and the pivot slot structure are disposed on the frame. The contact portion slides along the guiding structure when the bracket rotates relative to the supporter, so that position of the pivot portion moves from an end to the other end of the pivot slot structure structure, and the constraint portion contacts against the body for constraint rotation of the bracket.

20 Claims, 9 Drawing Sheets

ROTARY MECHANISM AND ELECTRONIC DEVICE THEREOF

BACKGROUND OF THE INVENTION

1. Field of the Invention

The present invention relates to a rotary mechanism and an electronic device thereof, and more particularly, to a rotary mechanism and a related electronic device utilizing own weight to provide rotary fixing function.

2. Description of the Prior Art

A conventional computer host utilizes a metal bracket to fix the electronic component with heavy weight and large volume, such as the optical disk driver, the hard disk driver and the other storage device. For convenient assembly and disassembly, the electronic component of the computer host can be assembled with and disposed inside the casing of the computer host via the rotary folding mechanism. Disassembly of the electronic component from the casing can be operated easily by the rotary folding mechanism. However, the conventional rotary folding mechanism does not have function of rotation constraint. When the rotary folding mechanism rotates out of the casing for replacement of the electronic component, the rotary folding mechanism may fall down accidentally and results in damage of the electronic component. Therefore, design of the rotary mechanism capable of fixing the rotation angle to increase operational safety when assembling and disassembling the electronic component is an important issue in the related computer mechanical design industry.

SUMMARY OF THE INVENTION

The present invention provides a rotary mechanism and a related electronic device utilizing own weight to provide rotary fixing function for solving above drawbacks.

According to the claimed invention, a rotary mechanism for adjusting a position of an electronic component relative to a base is disclosed. The rotary mechanism includes a supporter and a bracket. The bracket pivots to the supporter and is rotatably located between a first position and a second position. The supporter includes a body, a pivot portion and a support portion. The body is disposed on the base. The pivot portion is disposed on the body. The support portion includes a bar and a guiding structure. A bottom end of the bar is connected to the body. The guiding structure is disposed on a top end of the bar. The bracket includes a frame, a constraint portion, a pivot slot structure and a contact portion. The frame holds the electronic component. The constraint portion is disposed on a side of the frame adjacent to the supporter. The pivot slot structure is disposed on the frame and pivots to the pivot portion for rotating the bracket between the first position and the second position. The pivot slot structure includes a first area and a second area connected to each other. The contact portion is disposed on an edge of the frame. The contact portion contacts and slides relative to the guiding structure of the supporter when the bracket rotates between the first position and the second position. The pivot portion is located at the first area of the pivot slot structure when the bracket rotates relative to the supporter to the first position. The pivot portion further moves to the second area of the pivot slot structure when the bracket rotates relative to the supporter to the second position, and the constraint portion contacts against the body to constrain rotation of the bracket relative to the supporter at a first direction.

According to the claimed invention, an electronic device includes a base and a rotary mechanism rotatably disposed on the base. The rotary mechanism includes a supporter and a bracket. The bracket pivots to the supporter and is rotatably located between a first position and a second position. The supporter includes a body, a pivot portion and a support portion. The body is disposed on the base. The pivot portion is disposed on the body. The support portion includes a bar and a guiding structure. A bottom end of the bar is connected to the body. The guiding structure is disposed on a top end of the bar. The bracket includes a frame, a constraint portion, a pivot slot structure and a contact portion. The frame holds an electronic component. The constraint portion is disposed on a side of the frame adjacent to the supporter. The pivot slot structure is disposed on the frame and pivots to the pivot portion for rotating the bracket between the first position and the second position. The pivot slot structure includes a first area and a second area connected to each other. The contact portion is disposed on an edge of the frame. The contact portion contacts and slides relative to the guiding structure of the supporter when the bracket rotates between the first position and the second position. The pivot portion is located at the first area of the pivot slot structure when the bracket rotates relative to the supporter to the first position. The pivot portion further moves to the second area of the pivot slot structure when the bracket rotates relative to the supporter to the second position, and the constraint portion contacts against the body to constrain rotation of the bracket relative to the supporter at a first direction.

The present invention can decrease component amounts of the carrier for the electronic component, and provide an automatic constraint function for fixing the bracket. The rotary mechanism and the related electronic device of the present invention can automatically fix the bracket when the bracket rotates to the predetermined angle, to prevent the bracket from accidental fall. The present invention effectively increases operation safety and enhances assembly/disassembly efficiency to economize manufacturing period of the product.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
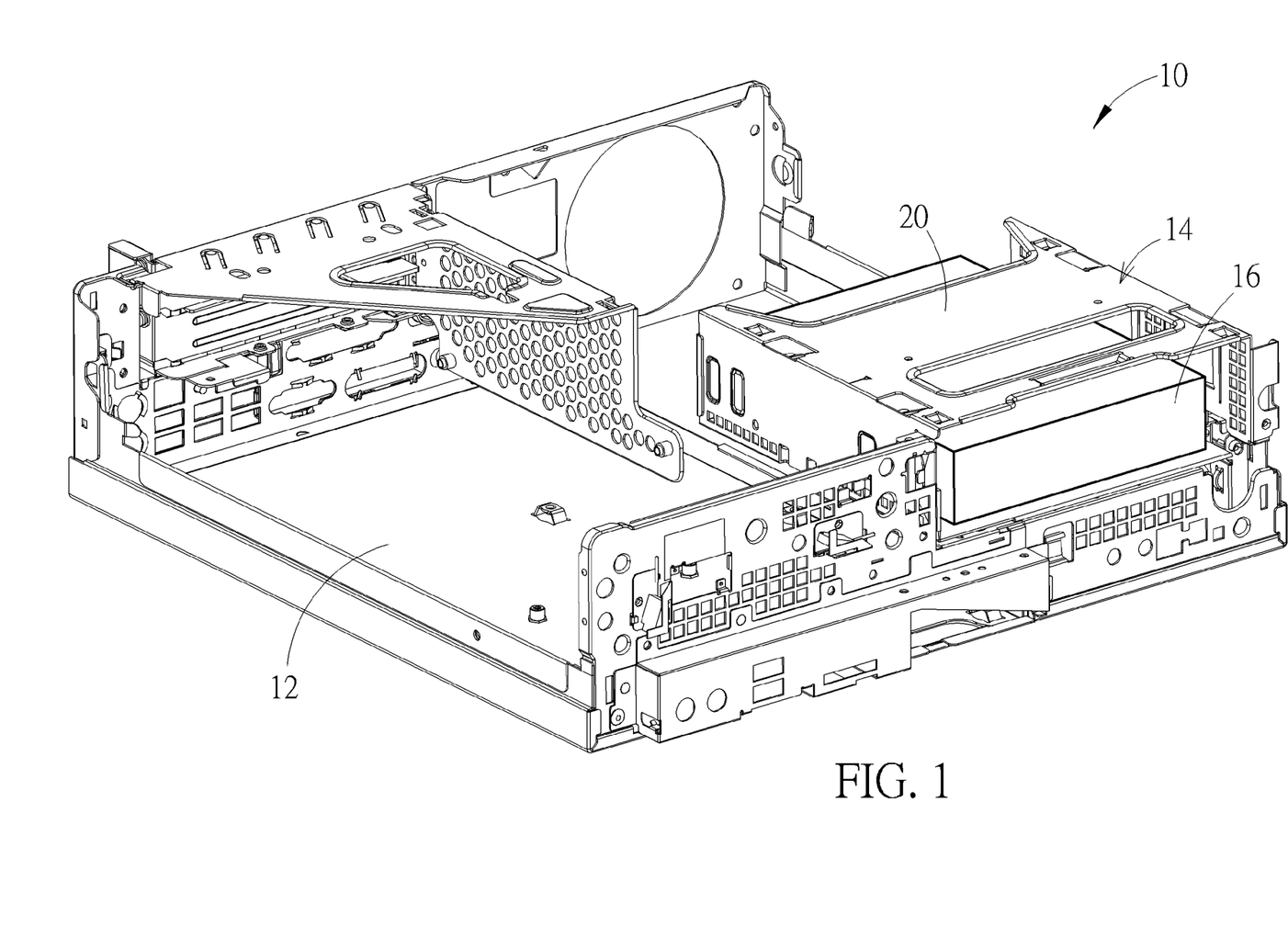
FIG. 1 and FIG. 2 respectively are diagrams of an electronic device in different operational modes according to an embodiment of the present invention.
Figure 2:
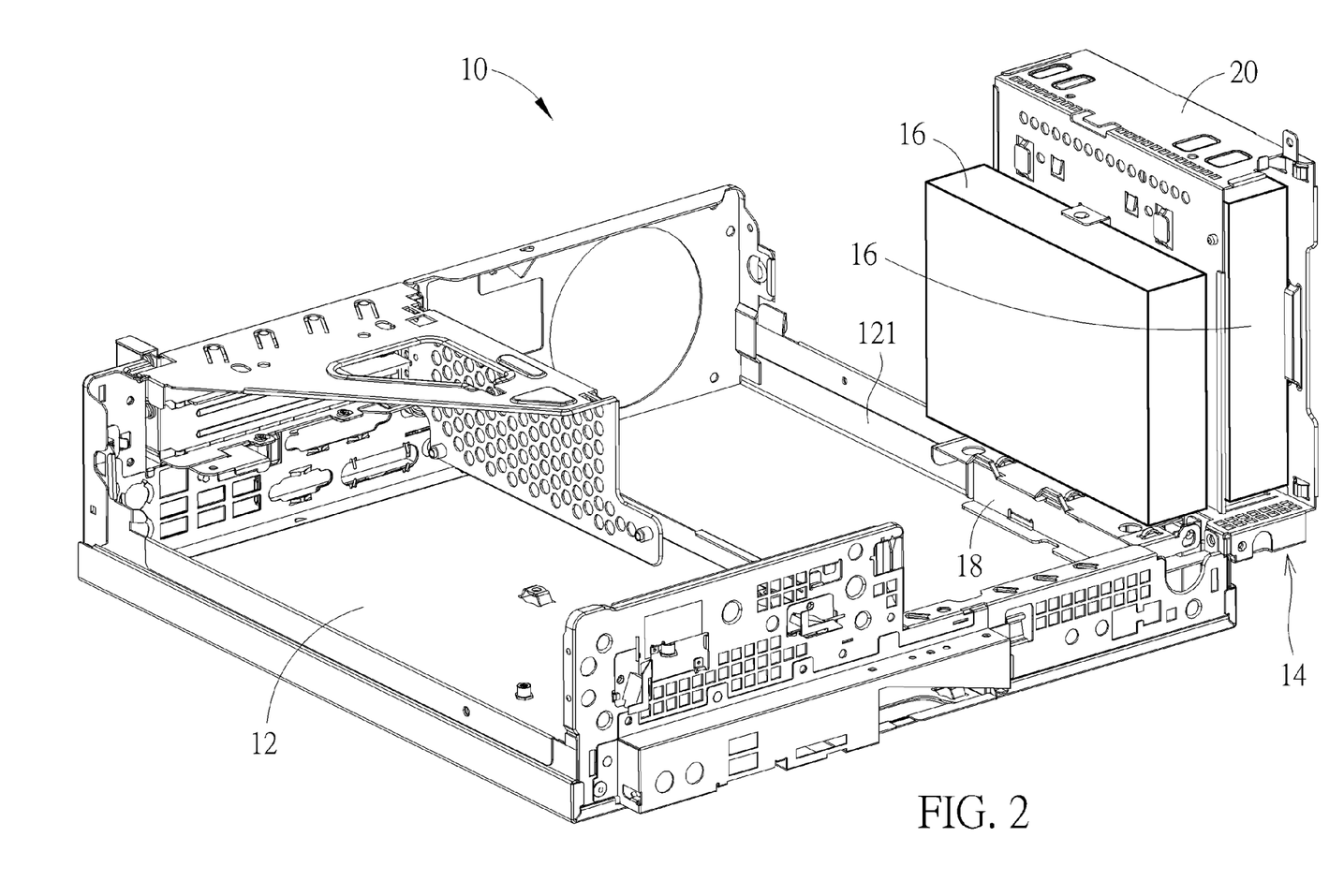

Please refer to FIG. 1 and FIG. 2. FIG. 1 and FIG. 2 respectively are diagrams of an electronic device 10 indifferent operational modes according to an embodiment of the present invention. The electronic device 10 includes a base 12 and a rotary mechanism 14. An electronic unit, such as the power supply and the main board, can be disposed on the base 12. The rotary mechanism 14 is utilized to hold one or more detachable electronic components 16, such as the hard disk and/or the optical disk drive. The rotary mechanism 14 is rotatably disposed on the base 12 and adjacent to a lateral wall 121 of the base 12. As shown in FIG. 1, the rotary mechanism 14 is accommodated inside the base 12, and the electronic device 10 is switched to the normal mode. For disassembly of the electronic component 16, as shown in FIG. 2, the rotary mechanism 14 can rotate relative to the lateral wall 121 to move out of the base 12, and the electronic component 16 can be disassembled conveniently.

Figure 3:
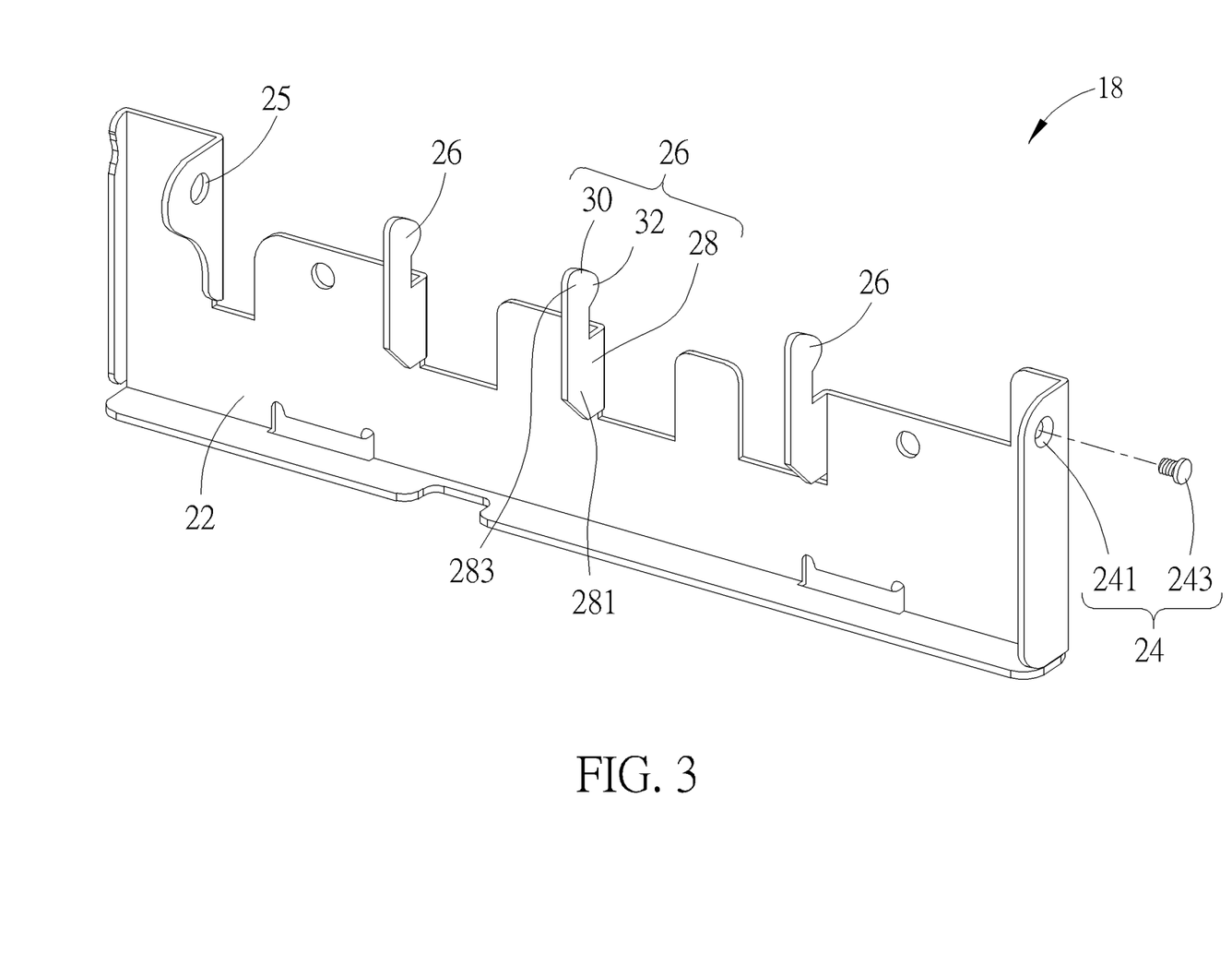
FIG. 3 is a diagram of a supporter according to the embodiment of the present invention.

The rotary mechanism 14 includes a supporter 18 and a bracket 20, and the bracket 20 pivots to the supporter 18. Please refer to FIG. 3. FIG. 3 is a diagram of the supporter 18 according to the embodiment of the present invention. The supporter 18 includes a body 22, a pivot portion 24 and a plurality of support portions 26. The body 22 is mounted to the lateral wall 121 to fix the supporter 18 on the base 12. The pivot portion 24 can include a pivot hole 241 and a pivot component 243. The pivot hole 241 is at least formed on a side of the body 22, and the pivot component 243 can be the screw passing through the pivot hole 241. The supporter 18 further can include a connect portion 25. The pivot portion 24 and the connect portion 25 are respectively disposed on opposite sides of the body 22. The connect portion 25 can be an annular hole or a slot-shaped hole.

The plurality of support portions 26 is disposed on the other side of the body 22 different from the pivot portion 24 and the connect portion 25, and is located between the pivot portion 24 and the connect portion 25. Each support portion 26 includes a bar 28, a guiding structure 30 and a protruding structure 32. A bottom end 281 of the bar 28 is connected to the body 22, and the guiding structure 30 is disposed on a top end 283 of the bar 28. The guiding structure 30 has predetermined curvature and predetermined length. The protruding structure 32 is disposed on a lateral side of the top end 283 and connected to the guiding structure 30. The guiding structure 30 and the protruding structure 32 respectively are arc structures, and the curvature of the guiding structure 30 is substantially different from a curvature of the protruding structure 32.

Figure 4:
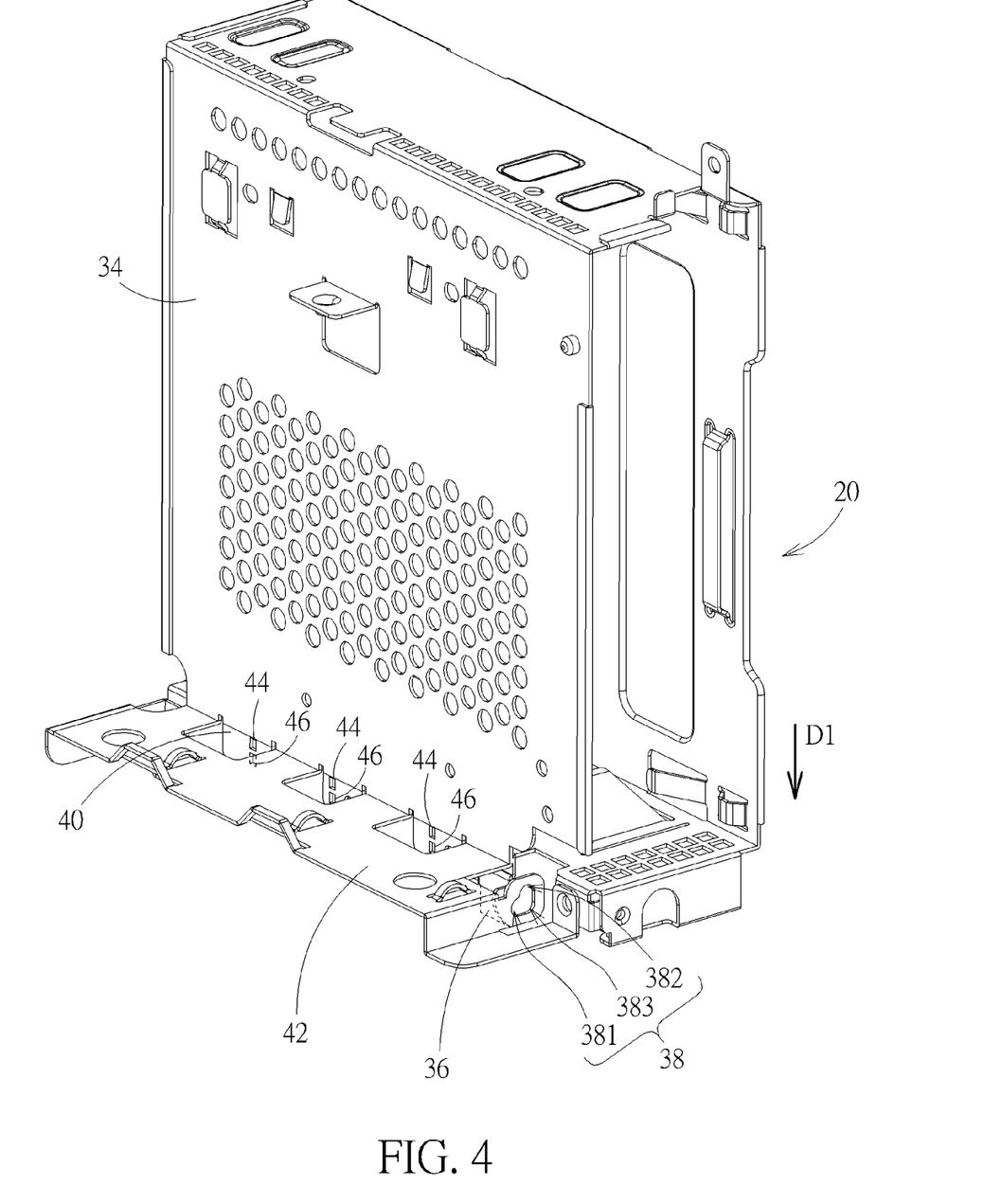
FIG. 4 is a diagram of a bracket according to the embodiment of the present invention.

Please refer to FIG. 4. FIG. 4 is a diagram of the bracket 20 according to the embodiment of the present invention. The bracket 20 includes a frame 34, a constraint portion 36, a pivot slot structure 38, a contact portion 40 and a stop portion 42. The electronic component 16 can be disposed inside the frame 34 or on an outer wall of the framer 34. The constraint portion 36 is disposed on a side of the frame 34 adjacent to the supporter 18. The pivot slot structure 38 is disposed on a position of the frame 34 close to the pivot portion 24, and the pivot component 243 can insert into the pivot slot structure 38 to pivotally connect the pivot portion 24 with the pivot slot structure 38. A shaft (not shown in figures) is disposed on a position of the bracket 20 opposite to the pivot slot structure 38, and pivots to the connect portion 25 of the supporter 18. The bracket 20 can rotate relative to the supporter 18 via an assembly of the pivot slot structure 38 and the pivot portion 24 and an assembly of the connect portion 25 and the shaft.

The contact portion 40 and the stop portion 42 are disposed on the bottom of the frame 34 and respectively face to different directions. An angle is formed between the contact portion 40 and the stop portion 42, for example, the angle between the contact portion 40 and the stop portion 42 is preferably equal to 90 degrees. As shown in FIG. 1, the stop portion 42 contacts against the body 22 of the supporter 18 to constrain rotation of the bracket 20 relative to the supporter 18 at the first direction D2 when the rotary mechanism 14 rotates relative to the base 12 to the closed mode (the normal mode). As shown in FIG. 2, the contact portion 40 slides along the guiding structure 30 when the rotary mechanism 14 rotates relative to the base 12 to the open mode (the detachable mode). The bracket 20 falls down due to its own gravity, the pivot portion 24 moves from an end of the pivot slot structure 38 to the other opposite end, the bracket 20 moves close to the supporter 18, and the constraint portion 36 contacts against the body 22 to constrain the rotation of the bracket 20.

The pivot slot structure 38 can selectively include a first area 381, a second area 382 and a bridge area 383 connected to each other. The first area 381 is connected to the second area 382 in a nonparallel manner, and the bridge area 383 is located between the first area 381 and the second area 382. For example, the first area 381, the second area 382 and the bridge area 383 are connected to form an L-shaped space. In this other embodiment, the bridge area 383 can be omitted, and the first area 381 and the second area 382 are connected to form an arc space. As the bracket 20 rotates relative to the supporter 18 to the open mode, the pivot component 243 of the pivot portion 24 can move from the first area 381 to the second area 382, height difference between the first area 381 and the second area 382 can be substantially equal to movement of the bracket 20 by the gravity. For preferred operation of the rotary mechanism 14, the pivot slot structure 38 utilizes the bridge area 383 to provide tolerance. As shown in FIG. 4, the pivot slot structure 38 can be designed as the L-shaped structure, so that vertical shift and horizontal shift of the bracket 20 are simultaneously generated when the bracket 20 rotates relative to the supporter 18.

As shown in FIG. 3 and FIG. 4, the bracket 20 can further include a plurality of first engaged slots 44 formed on position of the constraint portion 36 adjacent to the support portion 26. An amount of the first engaged slot 44 corresponds to an amount of the support portion 26. When the bracket 20 rotates relative to the supporter 18 to the position shown in FIG. 2, the protruding structure 32 of the support portion 26 can be engaged with the first engaged slot 44, to constrain the rotation of the bracket 20 and to prevent the bracket 20 from overturn. The bracket 20 further can include a plurality of second engaged slots 46 formed on the contact portion 40 of the constraint portion 40. The second engaged slots 46 are vertically arranged below the first engaged slots 44, and each second engaged slot 46 is located at the stretching direction D1 of the corresponding first engaged slot 44. As the bracket 20 rotates to the maximum angle, the protruding structure 32 can be alternatively engaged with the first engaged slot 44 or the second engaged slot 46 according to the height difference between the bracket 20 and the supporter 18. Therefore, the rotary mechanism 14 can utilize engagement motion to provide hand feeling when the bracket 20 is switched to and located at the normal mode.

Figure 5:
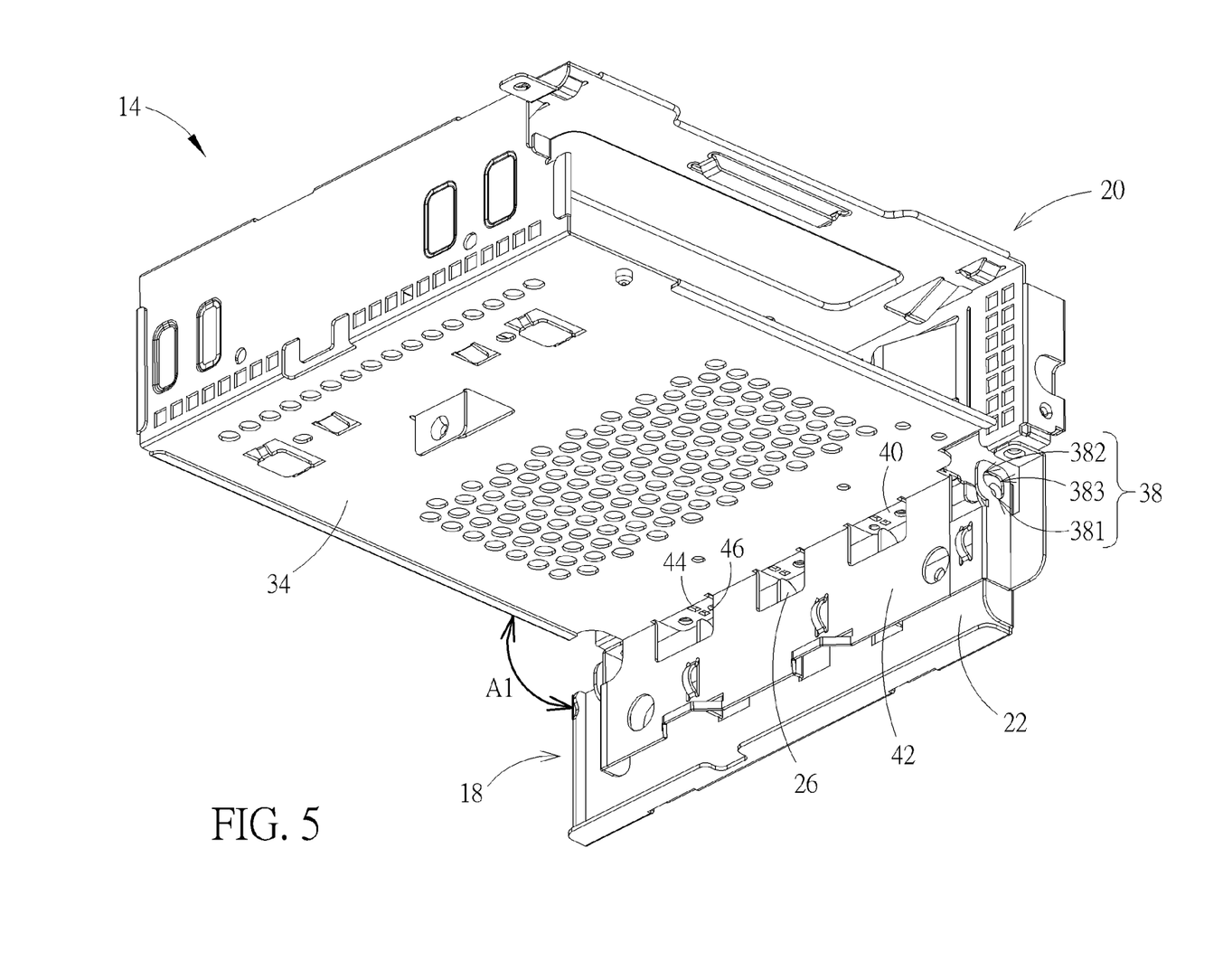
FIG. 5 to FIG. 8 respectively are diagrams of a rotary mechanism in different operational modes according to the embodiment of the present invention.

Please refer to FIG. 3, FIG. 4, and FIG. 5 to FIG. 8. FIG. 5 to FIG. 8 respectively are diagrams of the rotary mechanism 14 in different operational modes according to the embodiment of the present invention. As shown in FIG. 5, which is a partially structural diagram of the rotary mechanism shown in FIG. 1, the stop portion 42 contacts against the body 22 of the supporter 18, the bracket 20 is stably at the closed mode. The first angle A1 between the bracket 20 and the base 12 (not shown in FIG. 5) can be preferably equal to zero degree, which means the bracket 20 is substantially parallel to the base 12. In the meanwhile, the pivot component 243 of the pivot portion 24 moves into the first area 381, and the bracket 20 rotates relative to the supporter 18 to be located at the first position.

Figure 6:
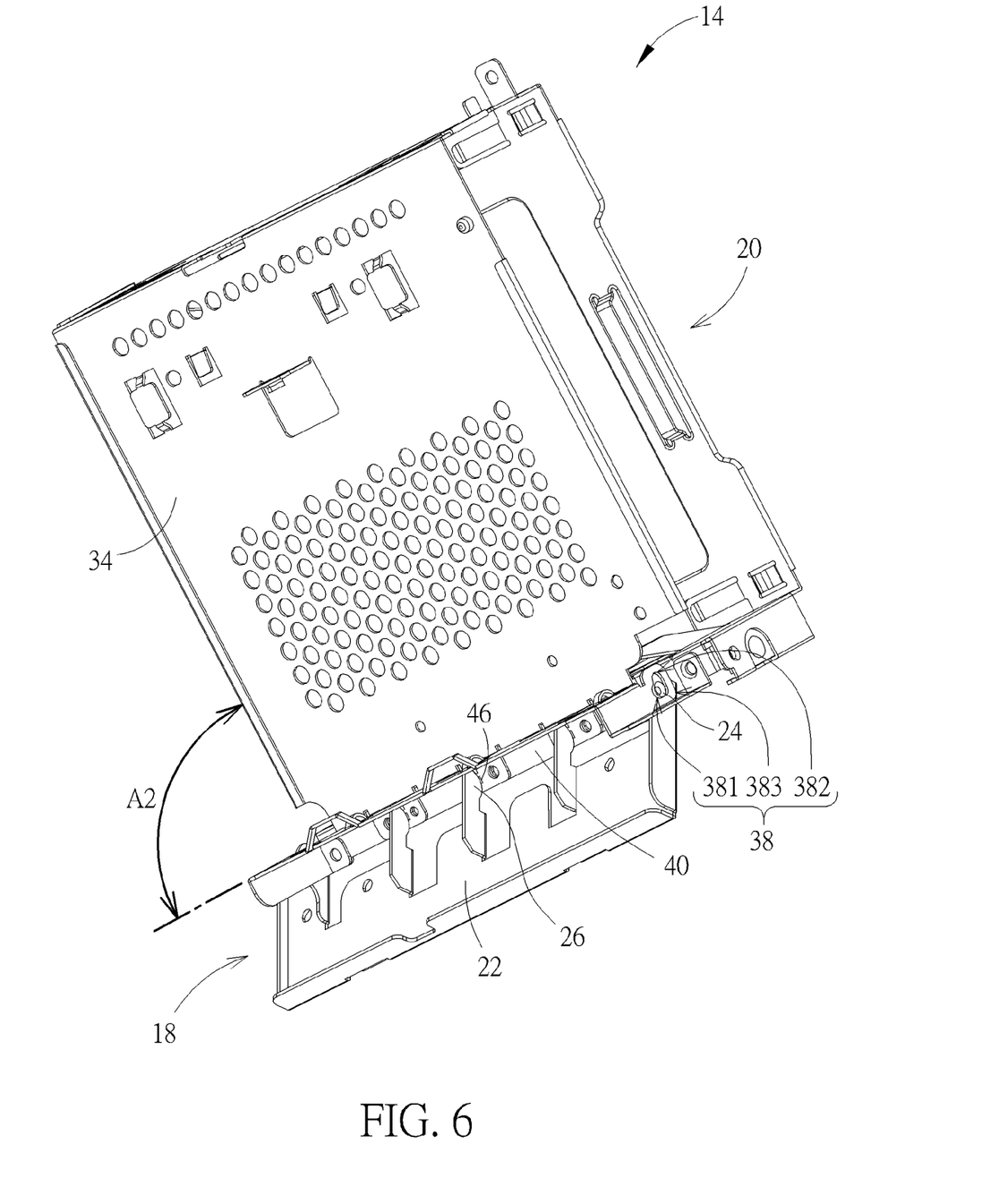

As shown in FIG. 6, the bracket 20 rotates from the first angle A1 to the second angle A2, and the bracket 20 rotates relative to the supporter 18 to depart from the first position.

The pivot component 243 of the pivot portion 24 rotates inside the first area 381 of the pivot slot structure 38 without linear movement relative to the pivot slot structure 38, which means the rotary center of the pivot portion 24 is immobile. The protruding structure 32 is disposed by the bar 28, the contact portion 40 of the bracket 20 slides from the guiding structure 30 to the protruding structure 32, and the protruding structure 32 can be engaged with the second engaged slot 46 (as shown in FIG. 3 and FIG. 4) of the supporter 18. The bracket 20 is shifted by the protruding structure 32, so that the rotary center of the pivot portion 24 relative to the pivot slot structure 38 can move between the first area 381 and the second area 382. In this embodiment of the present invention, the second angle A2 can be preferably equal to 45 degrees.

Figure 7:
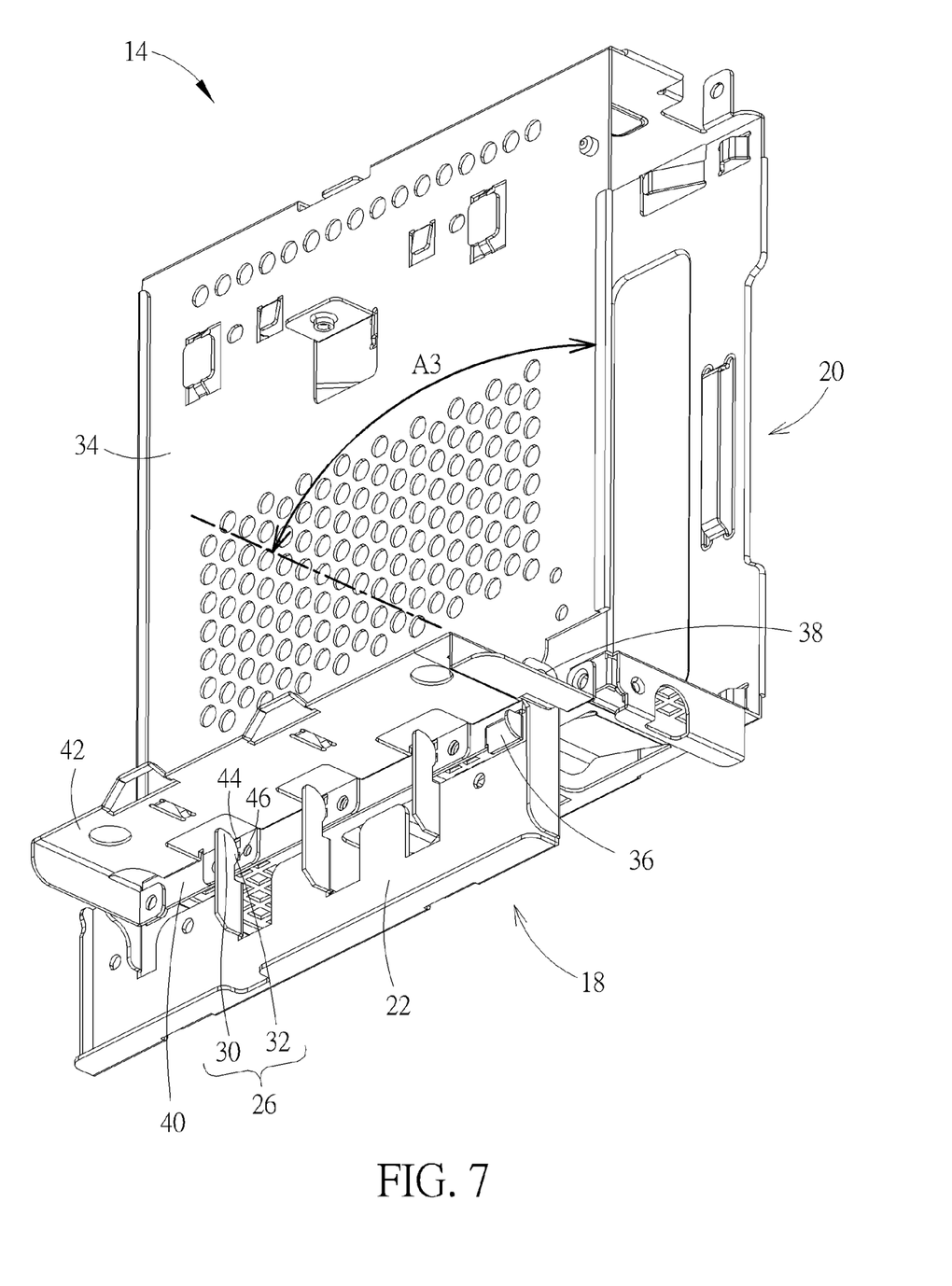

As shown in FIG. 7, the bracket 20 rotates from the second angle A2 to the third angle A3, and the third angle A3 can be preferably equal to 90 degrees. When the bracket 20 rotates relative to the supporter 18 to the maximum angle (the third angle A3), the contact portion 40 slides along the protruding structure 32, position of the bracket 20 can be shifted according to arc structure of the protruding structure 32. For example, the position of the bracket 20 may have the vertical shift or the horizontal shift. In the meantime, the protruding structure 32 is engaged inside the second engaged slot 46, the pivot component 243 of the pivot portion 24 can simultaneously rotate inside the pivot slot structure 38 and move from the first area 381 to the bridge area 383.

Figure 8:
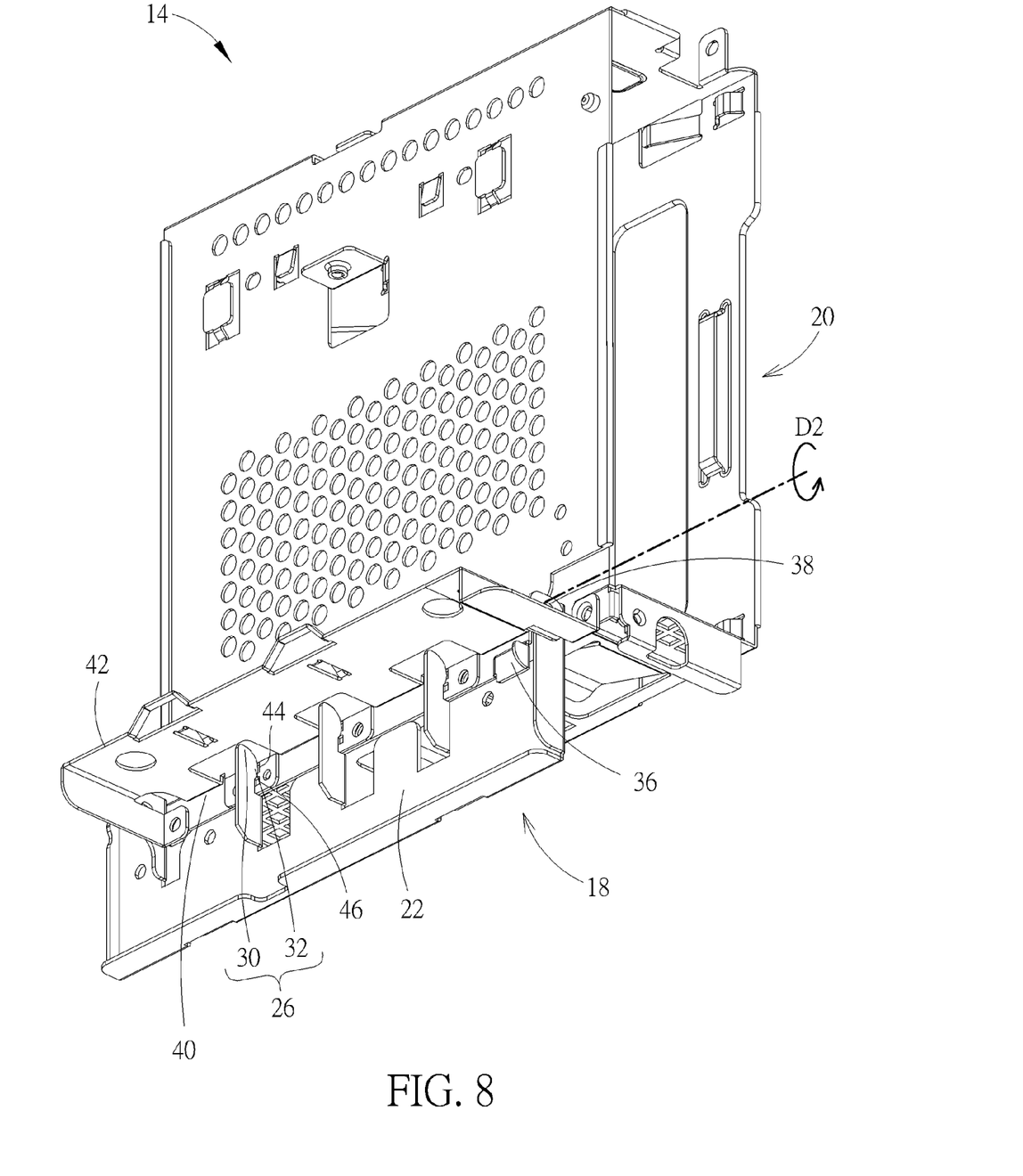
Figure 9:
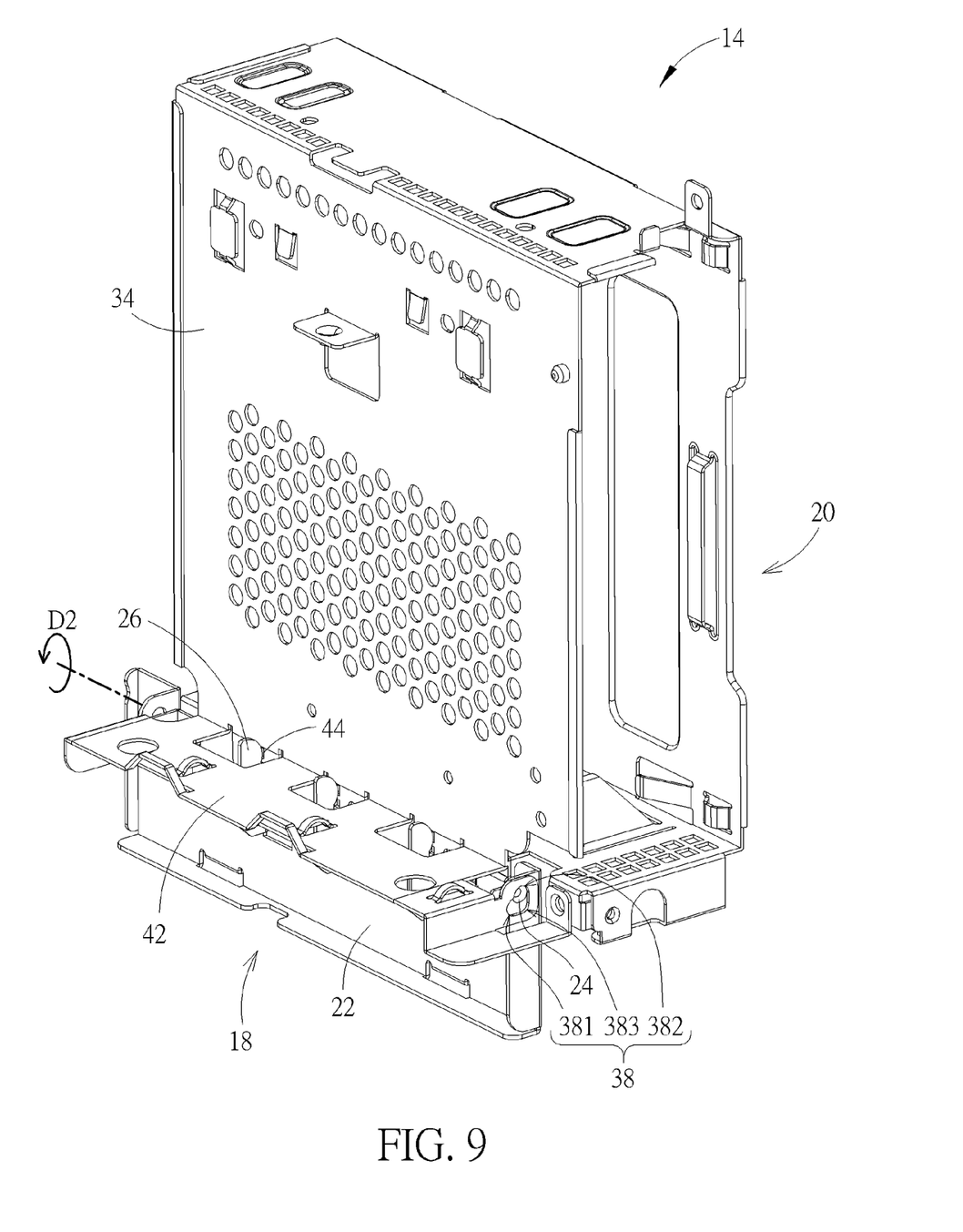
FIG. 9 is another view of the rotary mechanism shown in FIG. 8.

Please refer to FIG. 8 and FIG. 9. FIG. 9 is another view of the rotary mechanism 14 shown in FIG. 8. When an external force applied to the rotation of the bracket 20 is removed, the bracket 20 falls down by the gravity. The pivot component 243 of the pivot portion 24 moves from the bridge area 383 to the second area 382 of the pivot slot structure 38, and the bracket 20 rotates relative to the supporter 18 to the second position. The constraint portion 38 contacts against the body 22 of the supporter 18 due to structural interference, and the protruding structure 32 moves from the second engaged slot 46 to the first engaged slot 44 (as shown in FIG. 3 and FIG. 4), so as to constrain the rotation of the bracket 20 relative to the supporter 18 at the first direction D2.

For switching the rotary mechanism 14 from the open mode to the closed mode, the external force is applied to lift the bracket 20, to relieve the structural interference between the constraint portion 36 and the body 22. The pivot component 243 of the pivot portion 24 can move from the second area 382 to the bridge area 383 of the pivot slot structure 38, as shown in FIG. 8 to FIG. 7. Then, the bracket 20 rotates to be accommodated inside the base 12, the pivot component 243 of the pivot portion 24 moves from the bridge area 383 to the first area 381 of the pivot slot structure 38, and the stop portion 42 contacts against the supporter 18, as shown in FIG. 7 to FIG. 5. The bracket 20 can rotate relative to the supporter 18 from the second position shown in FIG. 8 to the first position shown in FIG. 5, and the rotary mechanism 14 is switched to the closed mode.

In conclusion, the rotary mechanism of the present invention utilizes an arc structure of the top end of the support portion to control a rotation track of the bracket relative to the supporter, to ensure the pivot portion of the supporter can be located at the first area or the bridge area when the bracket does not fall. The bracket can freely rotate because the constraint portion is not interfered with the body. As the contact portion moves from the guiding structure to the protruding structure, the support portion does not provide an upward force to the bracket, and the bracket falls down after the external force is removed. The pivot slot structure contacts the pivot portion by the second area, and the constraint portion misaligns with the body due to the fall of the bracket, so that the rotary mechanism can prevent the bracket from rotation relative to the supporter via the structural interference between the constraint portion and the body. The protruding structure of the support portion can be sequentially engaged with the second engaged slot and the first engaged slot during the fall of the bracket, vibration of the bracket is generated when the protruding structure is switched between the two engaged slots for prompt of the hand feeling. Closing procedure of the rotary mechanism of the present invention is reverse operation of the above-mentioned opening procedure, and a detailed description is omitted herein for simplicity.

Comparing to the prior art, the present invention can decrease component amounts of the carrier for the electronic component, and provide an automatic constraint function for fixing the bracket. The rotary mechanism and the related electronic device of the present invention can automatically fix the bracket when the bracket rotates to the predetermined angle, to prevent the bracket from accidental fall. The present invention effectively increases operation safety and enhances assembly/disassembly efficiency to economize manufacturing period of the product.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A rotary mechanism for adjusting a position of an electronic component relative to a base, the rotary mechanism comprising:
    a supporter, the supporter comprising:
        a body disposed on the base;
        a pivot portion disposed on the body; and
        a support portion comprising:
            a bar, a bottom end of the bar being bent from the body; and
            a guiding structure stretching from a top end of the bar; and
    a bracket pivoting to the supporter and rotatably located between a first position and a second position, the bracket comprising:
        a frame for holding the electronic component;
        a pivot slot structure disposed on the frame and pivoting to the pivot portion for rotating the bracket between the first position and the second position, the pivot slot structure comprising a first area and a second area connected to each other in a curved manner;
        a contact portion disposed on an edge of the frame, the contact portion contacting and sliding between an upper side and a lateral side of the guiding structure of the supporter when the bracket rotates between the first position and the second position; and
        a constraint portion disposed on an edge of the contact portion opposite to the frame;
    wherein the pivot portion is located at the first area of the pivot slot structure and the contact portion contacts against the upper side when the bracket rotates relative to the supporter to the first position, the pivot portion further moves to the second area of the pivot slot structure to clamp the constraint portion and the contact portion respectively between the body and the lateral side of the guiding structure when the bracket rotates relative to the supporter to the second position, so as to constrain rotation of the bracket relative to the supporter at a first direction.

2. The rotary mechanism of claim 1, wherein the bracket further comprises a stop portion connected to the contact portion, an angle is formed between the stop portion and the contact portion, the stop portion contacts against the body of the supporter when the bracket rotates relative to the supporter to the first position, so as to constrain the rotation of the bracket relative to the supporter at the first direction.

3. The rotary mechanism of claim 1, wherein the pivot slot structure further comprises a bridge area connected between the first area and the second area.

4. The rotary mechanism of claim 1, wherein the support portion further comprises a protruding structure disposed on a side of the bar and connected to the guiding structure, the contact portion of the bracket accordingly contacts and slides relative to the protruding structure when the bracket rotates from the first position to the second position.

5. The rotary mechanism of claim 4, wherein the bracket further comprises a first engaged slot formed on the contact portion, the protruding structure is accordingly engaged with the first engaged slot when the bracket rotates from the first position to the second position.

6. The rotary mechanism of claim 5, wherein the bracket further comprises a second engaged slot formed on the contact portion and located at a stretching direction of the first engaged slot, the protruding structure is accordingly engaged with the first engaged slot or the second engaged slot when the bracket rotates from the first position to the second position.

7. The rotary mechanism of claim 4, wherein the guiding structure and the protruding structure respectively are arc structures, and a curvature of the guiding structure is substantially different from a curvature of the protruding structure.

8. The rotary mechanism of claim 7, wherein the contact portion slides from the guiding structure to the protruding structure when the bracket rotates from the first position to the second position, so as to vary a rotary center of the pivot portion relative to the pivot slot structure.

9. The rotary mechanism of claim 1, wherein the pivot portion rotates inside the first area of the pivot slot structure without linear movement when the bracket rotates relative to the supporter from a first angle to a second angle.

10. The rotary mechanism of claim 9, wherein the pivot portion keeps rotation inside the first area and then moves to the second area when the bracket rotates relative to the supporter from the second angle to a third angle.

11. An electronic device comprising:
a base; and
a rotary mechanism rotatably disposed on the base, the rotary mechanism comprising:
  a supporter, the supporter comprising:
    a body disposed on the base;
    a pivot portion disposed on the body; and
    a support portion comprising:
      a bar, a bottom end of the bar being bent from the body; and
      a guiding structure stretching from a top end of the bar; and
  a bracket pivoting to the supporter and rotatably located between a first position and a second position, the bracket comprising:
    a frame for holding an electronic component;
    a pivot slot structure disposed on the frame and pivoting to the pivot portion for rotating the bracket between the first position and the second position, the pivot slot structure comprising a first area and a second area connected to each other in a curved manner;
    a contact portion disposed on an edge of the frame, the contact portion contacting and sliding between an upper side and a lateral side of the guiding structure of the supporter when the bracket rotates between the first position and the second position; and
    a constraint portion disposed on an edge of the contact portion opposite to the frame;
  wherein the pivot portion is located at the first area of the pivot slot structure and the contact portion contacts against the upper side when the bracket rotates relative to the supporter to the first position, the pivot portion further moves to the second area of the pivot slot structure to clamp the constraint portion and the contact portion respectively by the body and the lateral side of the guiding structure when the bracket rotates relative to the supporter to the second position, so as to the supporter at a first direction.

12. The electronic device of claim 11, wherein the bracket further comprises a stop portion connected to the contact portion, an angle is formed between the stop portion and the contact portion, the stop portion contacts against the body of the supporter when the bracket rotates relative to the supporter to the first position, so as to constrain the rotation of the bracket relative to the supporter at the first direction.

13. The electronic device of claim 11, wherein the pivot slot structure further comprises a bridge area connected between the first area and the second area.

14. The electronic device of claim 11, wherein the support portion further comprises a protruding structure disposed on a side of the bar and connected to the guiding structure, the contact portion of the bracket accordingly contacts and slides relative to the protruding structure when the bracket rotates from the first position to the second position.

15. The electronic device of claim 14, wherein the bracket further comprises a first engaged slot formed on the contact portion, the protruding structure is accordingly engaged with the first engaged slot when the bracket rotates from the first position to the second position.

16. The electronic device of claim 15, wherein the bracket further comprises a second engaged slot formed on the contact portion and located at a stretching direction of the first engaged slot, the protruding structure is accordingly engaged with the first engaged slot or the second engaged slot when the bracket rotates from the first position to the second position.

17. The electronic device of claim 14, wherein the guiding structure and the protruding structure respectively are arc structures, and a curvature of the guiding structure is substantially different from a curvature of the protruding structure.

18. The electronic device of claim 17, wherein the contact portion slides from the guiding structure to the protruding structure when the bracket rotates from the first position to the second position, so as to vary a rotary center of the pivot portion relative to the pivot slot structure.

19. The electronic device of claim 11, wherein the pivot portion rotates inside the first area of the pivot slot structure without linear movement when the bracket rotates relative to the supporter from a first angle to a second angle.

20. The electronic device of claim 19, wherein the pivot portion keeps rotation inside the first area and then moves to the second area when the bracket rotates relative to the supporter from the second angle to a third angle.

* * * * *